US005579434A

United States Patent [19]

Kudo et al.

[11] Patent Number: 5,579,434

[45] Date of Patent: Nov. 26, 1996

[54] SPEECH SIGNAL BANDWIDTH COMPRESSION AND EXPANSION APPARATUS, AND BANDWIDTH COMPRESSING SPEECH SIGNAL TRANSMISSION METHOD, AND REPRODUCING METHOD

[75] Inventors: Yasushi Kudo, Kamakura; Yoshiro Kokuryo, Tachikawa, both of Japan

[73] Assignee: Hitachi Denshi Kabushiki Kaisha, Tokyo, Japan

[21] Appl. No.: 354,035

[22] Filed: Dec. 6, 1994

[30] Foreign Application Priority Data

Dec. 6, 1993 [JP] Japan .................................... 5-305460

[51] Int. Cl.[6] .................................................. G01L 3/02

[52] U.S. Cl. .................................................. 395/2.28

[58] Field of Search ............ 381/36, 38; 395/2.29–2.31, 395/2.32, 2.33, 2.34, 2.91, 2.92, 2.93, 2.94, 2.95

[56] References Cited

U.S. PATENT DOCUMENTS 4,752,956 6/1988 Sluijter ..................................... 381/38
5,001,758 3/1991 Galand et al. ............................ 381/36
5,060,269 10/1991 Zinser ...................................... 381/38

OTHER PUBLICATIONS

Nguyen et al., "Correcting Spectral Envelope Shifts in Linear Predictive Speech Compression Systems", IEEE Milcom '90: A New Era, pp. 354–358, 1990.

"Residual–excited linear prediction vocoder with spectral flattener utilizing (LI–RELP)" Trans. of IEICE, vol. J68–A, No. 5, pp. 489–495, May 1985.

"The residual–excited linear prediction vocoder with transmission rate below 9.6 kbits/s", IEEE Trans. vol. COM–23, No. 12, Dec. 1975, pp. 1466–1474.

"Computer speech processing", Electronic Science series, Sanpo Publishing, Jun. 10, 1980, pp. 43–50.

*Primary Examiner*—Allen R. MacDonald
*Assistant Examiner*—Thomas J. Onka
*Attorney, Agent, or Firm*—Antonelli, Terry, Stout & Kraus

[57] ABSTRACT

A speech signal bandwidth compression and expansion apparatus and its method. On the transmitting side, system parameters are extracted from a speech signal by a linear prediction analyzer. A prediction residual signal is obtained by inverse filtering processing by using the system parameters. The prediction residual signal is lowered in sampling rate by a down-sampler and converted to a baseband signal. From the baseband signal, a time series signal is derived by a linear prediction synthesizer. Thereafter, the time series signal is converted to an analog signal and transmitted. On the receiving side, a received signal is subjected to inverse filtering processing to reproduce a baseband signal. The sampling rate of the reproduced baseband signal is raised to derive a time series signal. From the time series signal, a high frequency band component is generated. The high frequency band component is added to the baseband signal to generate an excitation signal. From the excitation signal, the original speech signal is reproduced by a linear prediction synthesizer.

11 Claims, 8 Drawing Sheets

LINER PREDICTION COEFFICIENTS $$y_n = -\sum_{i=1}^{p} a_i x_{n-i} + x_n$$

$$Y(z) = \frac{1}{1 + a_i z^{-1} + \cdots + a_p z^{-p}} X(z)$$

SPEECH SIGNAL BANDWIDTH COMPRESSION AND EXPANSION APPARATUS, AND BANDWIDTH COMPRESSING SPEECH SIGNAL TRANSMISSION METHOD, AND REPRODUCING METHOD

BACKGROUND OF THE INVENTION

The present invention relates to a bandwidth compression apparatus making possible bandwidth compression of speech signals in the state of analog signals, and in particular to a speech signal bandwidth compression and expansion apparatus suitable for analog transmission on narrow band radio transmission channels.

In recent years, use of radio transmission lines have gone on increasing. On the other hand, the radio frequency bands are finite resources. Therefore, compression of the occupied bandwidth is demanded strongly from not only the aspect of cost reduction but also the aspect of effective use of resources.

To take the instance of speech signal transmission as an example, the frequency band of human speech signals typically extends over several kilohertz although there is an individual difference. For transmission thereof, therefore, a transmission system having a frequency band of several kilohertz in the same way is needed. If the occupied bandwidth can be compressed without impairing articulation required for information transmission using speech, the cost required for the transmission system can be reduced.

From the past, therefore, various bandwidth compression techniques for speech signals have been proposed. In an example of known bandwidth compression techniques for speech signals, bandwidth compression of speech signals is attained by grasping the human vocal organ as a kind of autoregression system, simulating a speech signal as a signal generated by this autoregression system, and extracting system parameters by using prediction analysis. Examples are disclosed in the following papers.

(1) "Residual-excited linear prediction vocoder with spectral flattener utilizing the learning identification method (LI-RELP)", The Transactions of the Institute of Electronics, Information and Communication Engineers, vol. J68-A, No. 5, pp. 489–495, May 1985.

(2) "The residual-excited linear prediction vocoder with transmission rate below 9.6 kbit/s", IEEE Transactions on Communications, vol. COM-823, no. 12, December 1975, pp. 1466–1474.

SUMMARY OF THE INVENTION

In techniques described in the aforementioned papers, attention is not paid to the fact that system parameters are obtained as digital numerical information and there is a problem in application to an analog signal transmission system.

An object of the present invention is to provide a speech signal bandwidth compression and expansion apparatus capable of processing a signal in the state of analog waveform in spite of use of system parameters for bandwidth compression and capable of performing bandwidth compressed transmission via an analog signal transmission channel by using A/D conversion and D/A conversion.

Another object of the present invention is to provide a bandwidth compressed transmission method for compressing the occupied bandwidth of a signal and transmitting the signal by using an analog signal transmission channel without impairing articulation of the speech signal, and a reproduction method for reproducing the original speech signal from the resultant narrow band analog signal.

The above described objects are achieved by embedding spectrum information of a speech signal into a narrow band analog waveform in the form of autocorrelation, transmitting the signal from the transmitting side with a reduced sampling rate, and restoring the sampling rate to the original sampling rate on the receiving side.

Thereby, it becomes possible to transmit system parameters in the state of an analog waveform. As a result, a principal part of a speech signal can be transmitted sufficiently faithfully. Bandwidth compression with both a high quality and a high efficiency can thus be obtained.

More concrete description will now be given. First of all, a principal part of a speech signal, i.e., a low frequency band component is transmitted as it is, in the form of an analog waveform as a baseband signal. Then transmission of system parameters are performed by supplying the above described baseband signal to an autoregression system using system parameters and embedding the system parameters into the baseband signal of an analog waveform in the form of autocorrelation information.

The above described objects can be achieved by using the configuration heretofore described. In order to realize speech communication of a higher quality, however, a low frequency noise signal is added to the above described baseband signal. The low frequency noise signal takes charge of transmission of components having gentle changes included in the autocorrelation information. On the receiving side, the low frequency noise signal is removed after the system parameters have been extracted.

In parallel therewith, the power level of the low frequency noise signal is linked to the power level of a high frequency band component of the speech signal. Thereby, the power level of the high frequency band component of the speech signal which is not directly transmitted is conveyed.

It is now assumed that the lower limit frequency and upper limit frequency of the frequency band of a speech signal $y(n\Delta t)$ to be transmitted are $f_L$ and $f_m$, respectively, where $\Delta t=1/2f_m$ and $y(n\Delta t)$ represents a value of the speech signal at time $n\Delta t$ (where n is an integer).

Description will now given by taking the case where linear prediction coefficients are used as system parameters as an example. Linear prediction analysis is applied to the speech signal to derive linear prediction coefficients $a_i$ ($i=0, 1, 2, \ldots, N-1$) and a prediction residual signal $x(n\Delta t)$, where $x(n\Delta t)$ is the value of the prediction residual at time $n\Delta t$.

A high frequency band component of $f_m/C$ ($C>1$) or above is removed from the prediction residual signal $x(n\Delta t)$. A low frequency noise signal having a component of $f_L$ or below is added thereto to derive a baseband signal $x'(n\Delta t)$. Then this baseband signal $x'(n\Delta t)$ is applied to an autoregression system having ai as regression coefficients. An output signal $w(n\Delta T)$ is thus obtained.

Since the autoregression system is linear, this output signal $w(n\Delta T)$ does not contain the high frequency band component of $f_m/C$ or above, either. And $w(n\Delta T)$ is the value of the output signal at time $n\Delta T$ (where n is an integer), and $\Delta T=C/2f_m$.

Both the speech signal $y(n\Delta t)$ and the output signal $w(n\Delta T)$ have the same linear prediction coefficients $a_i$. However, the upper limit frequency of the speech signal $y(n\Delta t)$ is $f_m$, and the upper limit frequency of the output signal $w(n\Delta T)$ is $f_m/C$. Between prediction sampling intervals, therefore, there is a relation $\Delta T = C\Delta t$.

Since both the speech signal $y(n\Delta t)$ and the output signal $w(n\Delta T)$ thus have the same linear prediction coefficients $a_i$, spectrum information possessed by the original speech signal $y(n\Delta t)$ can be transmitted faithfully by simply transmitting the output signal $w(n\Delta T)$ having a narrow band analog waveform.

However, the spectrum information used here is information in the form of linear prediction coefficients (system parameters) and it is not the frequency spectrum itself. This frequency spectrum itself is regenerated on the receiving side by an excitation signal and an autoregression system.

DESCRIPTION OF THE PREFERRED EMBODIMENTS

Hereafter, a speech signal bandwidth compression and expansion apparatus according to the present invention will be described in detail by referring to illustrated embodiments.

Figure 1:
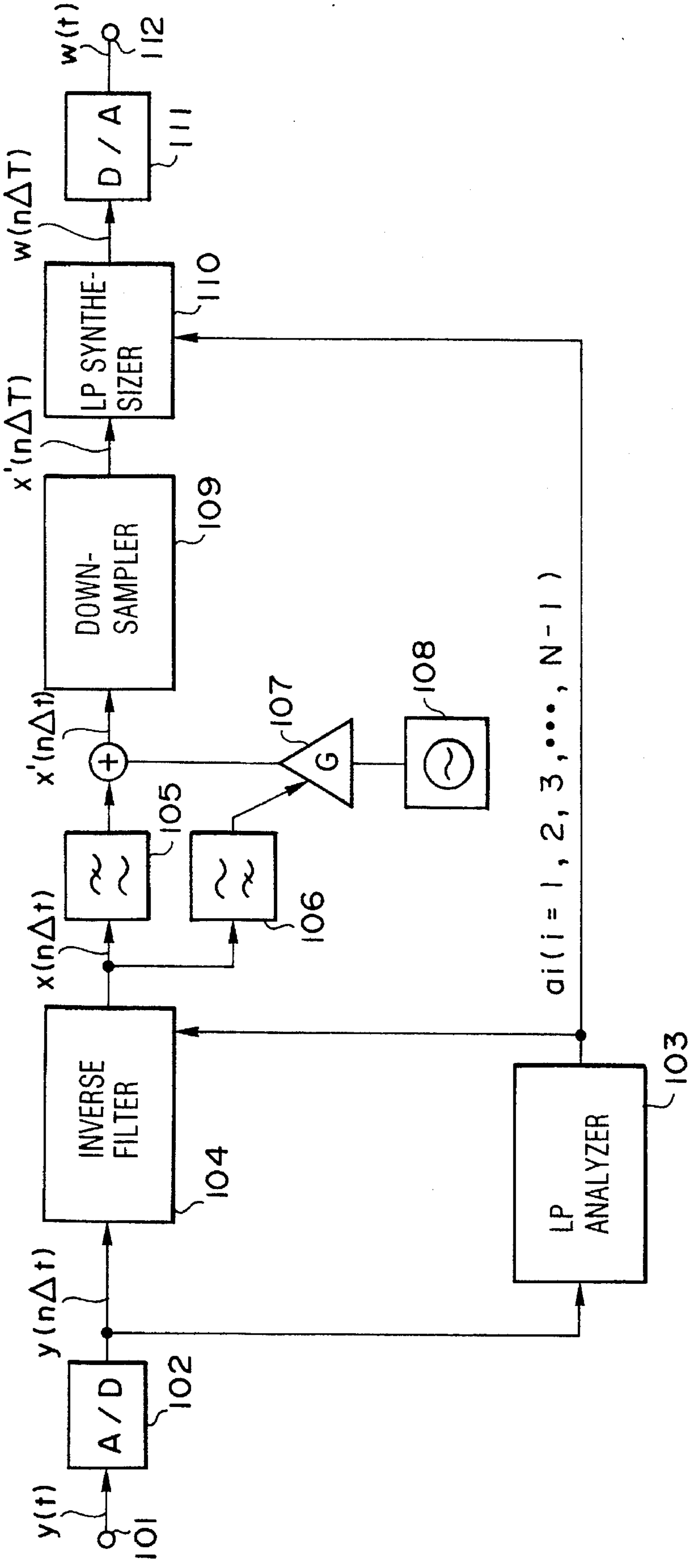
FIG. 1 is a block diagram showing the configuration of a transmitting side in an embodiment of a speech signal bandwidth compression and expansion apparatus according to the present invention.

First of all, FIG. 1 is a block diagram showing the configuration of a transmitting side in an embodiment of a speech signal bandwidth compression and expansion apparatus according to the present invention. A speech signal $y(t)$ to be transmitted is supplied to an input terminal 101. The speech signal $y(t)$ is first sampled by an A/D (analog-digital) converter 102 to generate a digital signal $y(n\Delta t)$. A signal $y(t)$ is the value of a speech signal at time t. As described above, the signal $y(n\Delta t)$ is the value of a speech signal at time $n\Delta t$ (where n is an integer).

It is now assumed that a lower limit frequency $f_L$ of the frequency component of the original speech signal $y(t)$ is $f_L$=300 HZ, an upper limit frequency $f_m$ is $f_m$=4000 Hz, and a sampling time interval $\Delta t$ is $\Delta t = 1/(2f_m) = 125$ μs (sampling frequency is 8 kHz).

Then this digital speech signal $y(n\Delta t)$ is grasped as a signal of autoregression type. By using linear prediction coefficients at as system parameters, the following definition is formulated.

$$y(n\Delta t) = x(n\Delta t) - \sum_{i=1}^{N-1} a_i \cdot y\{(n-i)\Delta t\} \tag{1}$$

The first term of the right side represents a tone source signal caused by vibration of vocal cords or expiration in a human mechanism of speech production. The second term represents the filtering function conducted by a human vocal tract.

The speech signal $y(n\Delta t)$ outputted from the A/D converter 102 is supplied to a linear prediction (LP) analyzer 103 and an inverse filter 104. In the linear prediction analyzer 103, estimated values of linear prediction coefficients $a_i$ ($i=1, 2, 3, \ldots, N-1$) are derived. In the inverse filter 104, computation according to the following equation (2) is conducted on the time series digital speech signal $y(n\Delta t)$ by using the linear prediction coefficients $a_i$. A prediction residual signal $x(n\Delta t)$ is thus obtained. The linear prediction analyzer 103 and the inverse filter 104 form a linear prediction system.

$$x(n\Delta t) = y(n\Delta t) + \sum_{i=1}^{N-1} a_i \cdot y\{(n-i)\Delta t\} \tag{2}$$

This prediction residual signal $x(n\Delta t)$ outputted from the inverse filter 104 contains frequency components ranging from $f_L$ to $f_m$. By using a low-pass filter 105 and a high-pass filter 106 having $f_m/C$ as the cutoff frequency, the prediction residual signal $x(n\Delta t)$ is split into a low frequency component ranging from $f_L$ to $f_m/C$ and a high frequency component ranging from $f_m/C$ to $f_m$. The low frequency component $f_L$ to $f_m/C$ is added to the output of a variable gain amplifier 107 and a resultant sum is supplied to a down-sampler 109. The high frequency component ranging from $f_m/C$ to $f_m$ is used as a gain control signal of the variable gain amplifier 107.

A noise signal generator 108 generates a low frequency noise signal having a frequency range from 0 Hz to $f_L$ Hz. This noise signal is supplied to the variable gain amplifier 107.

From the output of the variable gain amplifier 107, therefore, a low frequency noise signal having a power level controlled so as to be linked to the power level of the high frequency component ranging from $f_m/C$ to $f_m$ of the residual signal $x(n\Delta t)$ is obtained. The low frequency noise signal and the low frequency component ranging from $f_L$ to $f_m/C$ of the residual signal $x(n\Delta t)$ are added together. A resultant sum is inputted to the down-sampler 109 as a time series signal $x'(n\Delta t)$.

This time series signal $x'(n\Delta t)$ has a frequency component ranging from 0 to $f_m/C$. In the down-sampler 109, the time series signal $x'(n\Delta t)$ is thinned out to lower the sample rate. The time series signal $x'(n\Delta t)$ is thus converted to a baseband signal $x'(n\Delta T)$.

The following relation holds true.

$$\Delta T = C\Delta t$$

Assuming now that C=5, the sample rate is reduced to ⅕ and the sampling time interval becomes $\Delta T$=625 μs.

Then this baseband signal $x'(n\Delta T)$ is supplied to a linear prediction (LP) synthesizer 110. By using linear prediction coefficients $a_i$ (i=1, 2, 3, . . . , N−1) derived by the linear prediction analyzer 103 as regression coefficients, computation of an autoregression system according to the following equation (3) is conducted on the baseband signal x'(nΔT) to obtain a narrow band time series signal w(nΔT).

$$w(n\Delta T) = x'(n\Delta T) - \sum_{i=1}^{N-1} a_i \cdot w\{(n-i)\Delta T\} \quad (3)$$

Then the narrow band time series signal w(nΔT) obtained at the output of the linear prediction synthesizer 110 is supplied to a D/A (digital-analog) converter 111 and restored to a signal of an analog waveform. A narrow band analog signal w(t) is thus obtained at an output terminal 112.

As for this narrow band analog signal w(t), it contains a frequency component of 0 to $f_m$/C, i.e., 0 to 800 Hz.

On the other hand, the frequency component of the original speech signal y(t) has a lower limit frequency $f_L$=300 Hz and an upper limit frequency $f_m$=4000 Hz as described above. In this embodiment, C=5. Therefore, the frequency range of 300 Hz to 4000 Hz is compressed to 1/C. That is to say, bandwidth compression is performed, resulting in a frequency range of 0 Hz to 800 Hz.

The narrow band analog signal w(t) thus obtained at the output terminal 112 is carried by a analog signal transmission system, such as a communication medium like a telephone circuit or a radio channel and transmitted to the receiving side.

Figure 2:
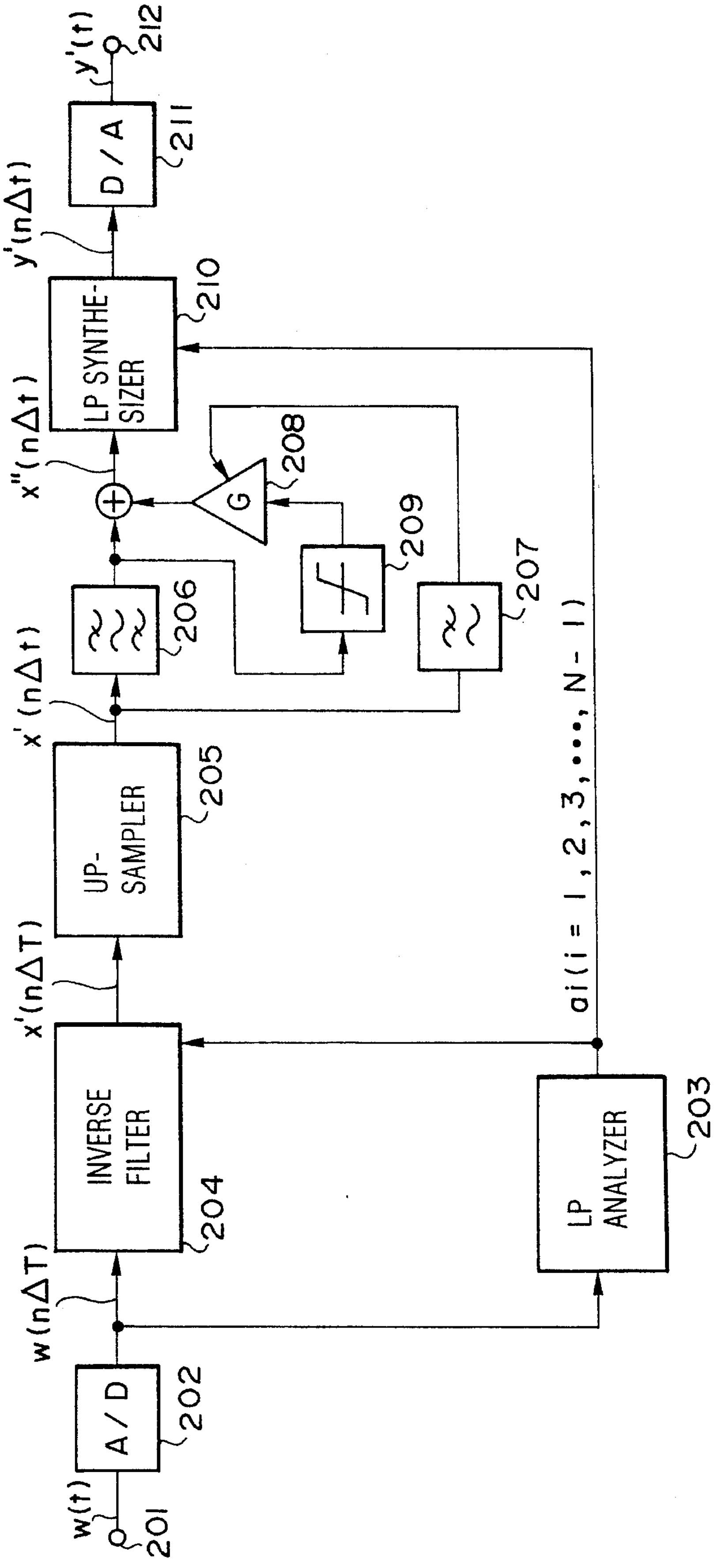
FIG. 2 is a block diagram showing the configuration of a receiving side in an embodiment of a speech signal bandwidth compression and expansion apparatus according to the present invention.

FIG. 2 is a block diagram showing the configuration of the receiving side in an embodiment of a speech signal bandwidth compression and expansion apparatus according to the present invention. The narrow band analog signal w(t) transmitted from the transmitting side shown in FIG. 1 is supplied to an input terminal 201. First of all, the narrow band analog signal w(t) is sampled by an A/D (analog-digital) converter 202. Conversion to a time series digital signal w(nΔT) is thus performed.

Then this time series digital signal w(nΔT) is supplied to a linear prediction analyzer 203 and an inverse filter 204. In the linear prediction analyzer 203, values of linear prediction coefficients $a_i$ (i=1, 2, 3, . . . , N−1) are restored by linear prediction analysis.

On the other hand, in the inverse filter 204, computation according to the following equation (4) is conducted on the time series digital speech signal w(nΔT) by using the linear prediction coefficients $a_i$. A reproduced baseband signal x'(nΔT) is thus obtained as a prediction residual signal. Thereby, a linear prediction system is formed.

$$x'(n\Delta T) = w(n\Delta T) + \sum_{i=1}^{N-1} a_i \cdot w\{(n-i)\Delta T\} \quad (4)$$

Then this reproduced baseband signal x'(nΔT) is supplied to an up-sampler 205. The up-sampler 205 conducts processing of inserting 0 in sample positions of the baseband signal x'(nΔT) thinned out by the downsampler 109 of the transmitting side. Thereby the sampling rate is increased and a reproduced time series signal x'(nΔt) having the original sampling frequency is obtained. Therefore, this sampling rate Δt becomes Δt=125 μs.

Subsequently, this reproduced time series signal x'(nΔt) is supplied to a band-pass filter 206 and a low-pass filter 207.

First of all, in the band-pass filter 206, a low frequency component ranging from $f_L$ to $f_m$/C of the reproduced time series signal x'(nΔt) is extracted. This low frequency component is supplied to a linear prediction synthesizer 210 together with the output of a variable gain amplifier 208.

This low frequency component of $f_L$ to $f_m$/C extracted from the band-pass filter 206 is supplied to a high frequency band signal generator 209 as well. From this high frequency band signal generator 209, a high frequency band signal having a frequency band of $f_m$/C to $f_m$ is generated. The high frequency band signal is supplied to the input of the variable gain amplifier 208.

On the other hand, a low frequency component ranging from 0 to $f_L$ of the reproduced time series signal x'(nΔt) is extracted in the low-pass filter 207. According to the power level of the low frequency component, the gain of the variable gain amplifier 208 is controlled.

From the variable gain amplifier 208, therefore, there is outputted a high frequency band signal having the same frequency component of $f_m$/C to $f_m$ and having a power level linked to that of the low frequency component of 0 to $f_L$ of the reproduced time series signal x'(nΔt) and consequently having a power level equal to that of the high frequency band component of $f_m$/C to $f_m$ of the prediction residual signal x(nΔt) on the transmitting side. The high frequency band signal and the low frequency component of $f_L$ to $f_m$/C extracted from the band-pass filter 206 are added together. An excitation signal x"(nΔt) is thus obtained. The excitation signal x"(nΔt) is supplied to the linear prediction synthesizer 210.

This excitation signal x"(nΔt) has already been restored to a signal having the original sampling frequency, because its original reproduced time series signal x'(nΔt) has a sampling rate increased by the up-sampler 205.

Therefore, the sampling time interval of the excitation signal x"(nΔt) is 125 μs. In addition, its frequency component has already been restored to the range of $f_L$ to $f_m$ (300 to 4000 Hz).

In the linear prediction synthesizer 210, computation of autoregression system according to the following equation (5) is conducted on the excitation signal x"(nΔt) by using, as autoregression coefficients, linear prediction coefficients $a_i$ (i=1, 2, 3, . . . , N−1) derived by the linear prediction analyzer 203. A reproduced speech signal y'(nΔt) including a time series signal is thus obtained.

$$y'(n\Delta t) = x''(n\Delta t) - \sum_{i=1}^{N-1} a_i \cdot y'\{(n-i)\Delta t\} \quad (5)$$

The reproduced speech signal y'(nΔt) obtained at the output of the linear prediction synthesizer 210 is subsequently supplied to a D/A converter 211 and restored to a signal having an analog waveform. An analog speech signal y'(t) is obtained at an output terminal 212.

Equation (5) representing the reproduced speech signal y'(nΔt) and equation (1) representing the original speech signal y(nΔt) of the transmitting side are written together below for comparison.

$$y(n\Delta t) = x(n\Delta t) - \sum_{i=1}^{N-1} a_i \cdot y\{(n-i)\Delta t\} \quad (1)$$

$$y'(n\Delta t) = x''(n\Delta t) - \sum_{i=1}^{N-1} a_i \cdot \{(n-i)\Delta t\} \quad (5)$$

As apparent from comparison of these equations, they differ only in that the first term of the right side is the prediction residual signal x(nΔt) in the original speech signal y(nΔt) of equation (1) whereas it is the excitation signal x"(nΔt) in the reproduced speech signal y'(nΔt) of equation (5).

As evident from the foregoing description, the prediction residual signal x(nΔt) is completely the same as the excitation signal x"(nΔt) in the frequency range of $f_L$ to $f_m$/C. In the frequency range of $f_m$/C to $f_m$, the high frequency band component of the original speech signal y(nΔt) has been replaced by a high frequency band generation component having an equal power level.

In this embodiment, however, spectrum information of speech is extracted as linear prediction coefficients $a_i$ (i=1, 2, 3, . . . , N−1) and transmitted. Even if a part of speech information is replaced by this high frequency band generation component, therefore, loss of the speech information can be suppressed to very little and sufficiently clear speech can be reproduced, while the frequency band is sufficiently compressed on the transmission channel.

In the configuration of the above described embodiment, the high-pass filter 106, the variable gain amplifier 107 and the noise signal generator 108 of the transmitting side, and the band-pass filter 206, the low-pass filter 207 and the variable gain amplifier 208 of the receiving side are auxiliary means for speech communication. Even in the configuration without these means, spectrum information of speech is transmitted as linear prediction coefficients and hence speech communication of a predetermined quality can be performed. As a matter of course, however, speech communication of a higher quality can be performed by adding the above described auxiliary means to the configuration as in the above described embodiment.

In the embodiment shown in FIGS. 1 and 2, the degree (N−1) of the linear prediction coefficients $a_i$ of the linear prediction analyzer 103 is typically limited to approximately 8 to 12 from the viewpoint of practical use. If the degree (N−1) has a value of approximately 8 to 12, a low frequency spectrum called speech pitch remains in the prediction residual signal x(nΔt) out-putted from the inverse filter 104.

As a result, however, pitch information remains in the narrow band analog signal w(t) as well. Since the remaining pitch information is extracted as prediction coefficients in the linear prediction analyzer 203 of the receiving side, the prediction coefficients ai of the receiving side are not restored so as to faithfully reflect the original value of the transmitting side. Therefore, there is a fear that speech may be somewhat degraded.

Increasing the above described degree of the prediction coefficients by a digit or so in order to suppress the remaining pitch information is not very practical, because a more complicated configuration increases the cost and delays signal processing.

An embodiment of the present invention with due regard to this point will hereafter be described.

Figure 3:
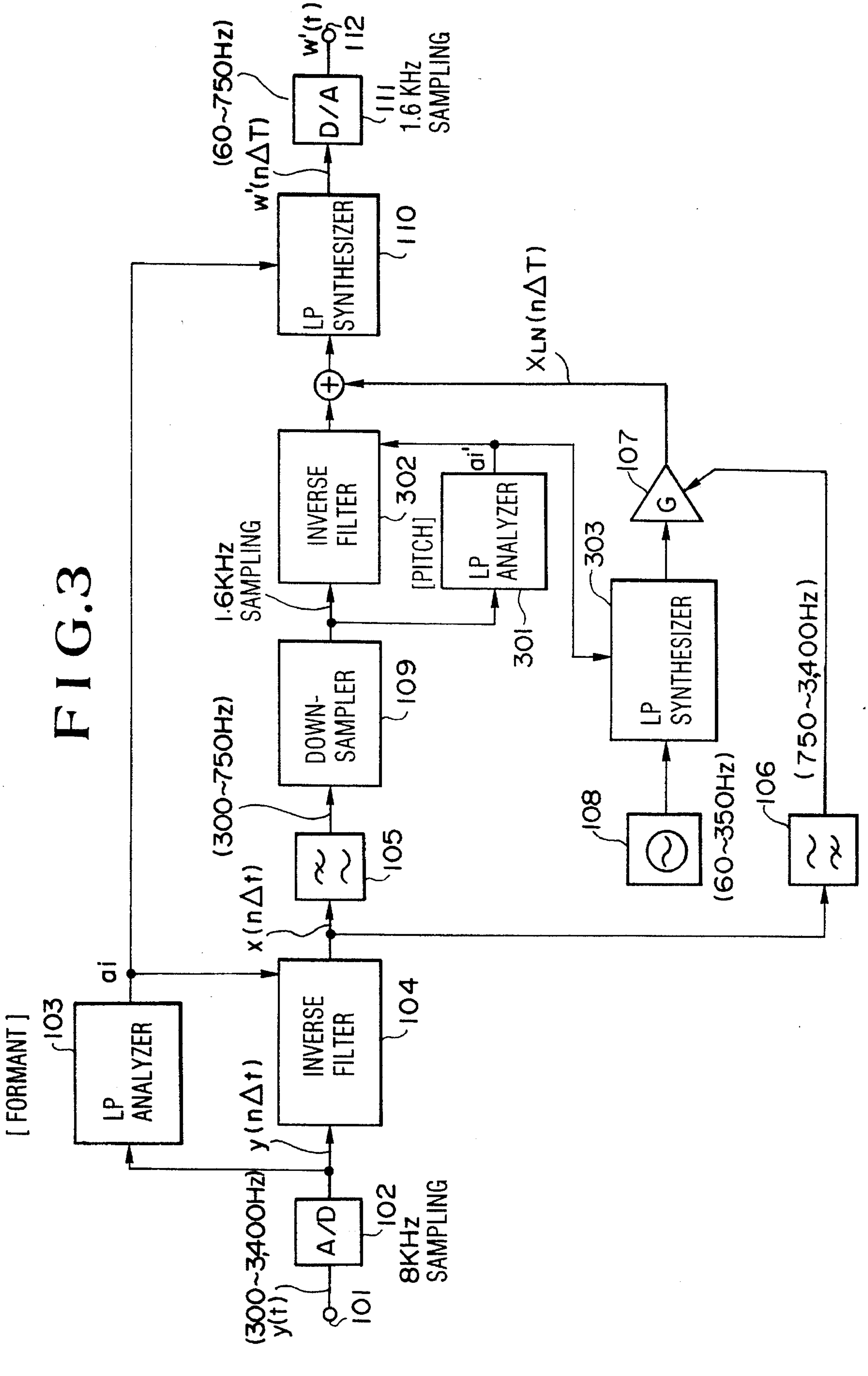
FIG. 3 is a block diagram showing the configuration of a transmitting side in another embodiment of a speech signal bandwidth compression and expansion apparatus according to the present invention.
Figure 4:
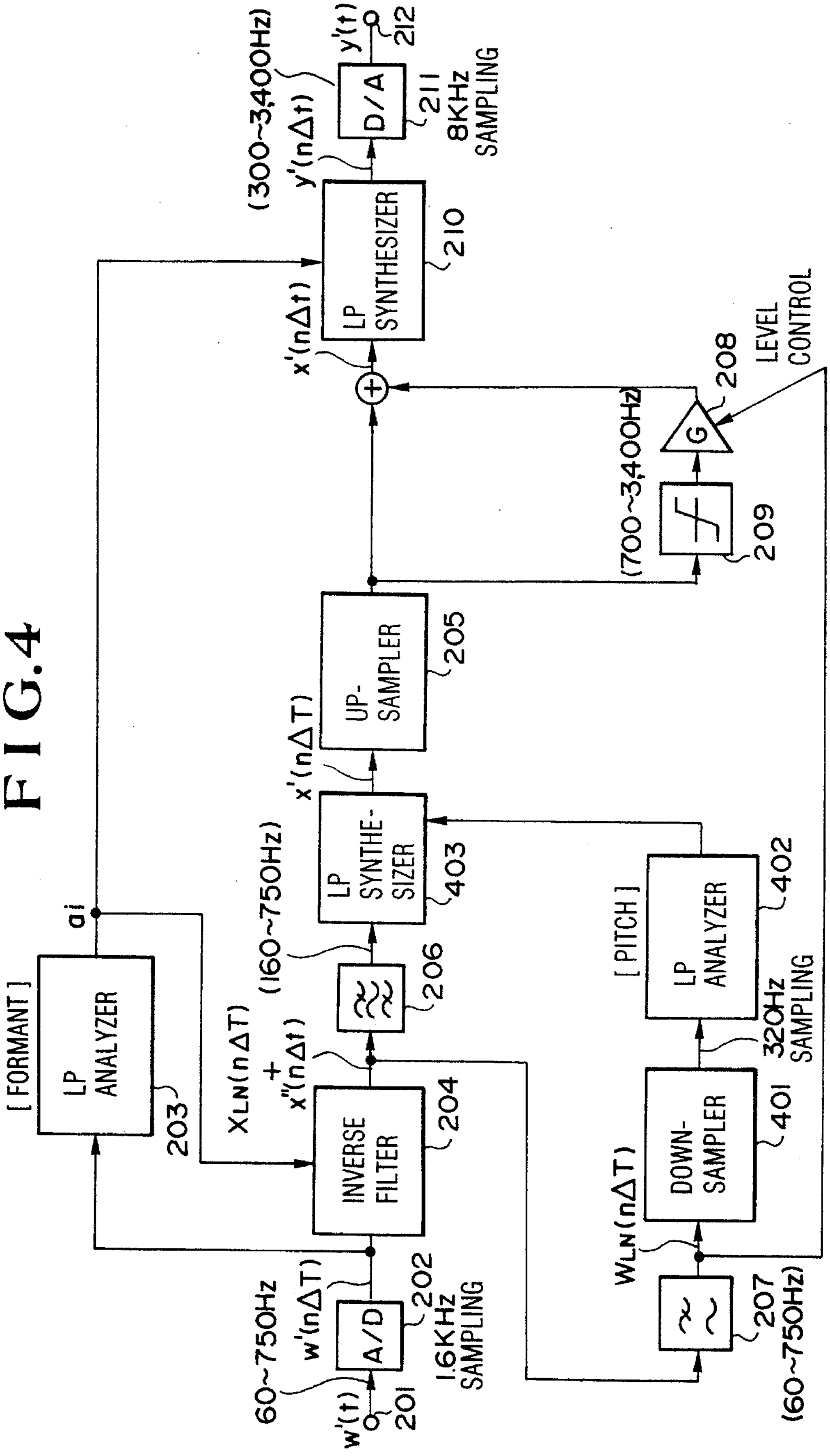
FIG. 4 is a block diagram showing the configuration of a receiving side in another embodiment of a speech signal bandwidth compression and expansion apparatus according to the present invention.

FIGS. 3 and 4 show another embodiment of the present invention. FIG. 3 shows the configuration of a transmitting side. FIG. 4 shows the configuration of a receiving side. Components which are identical with or correspond to those of the embodiment shown in FIGS. 1 and 2 are denoted by like characters and detailed description thereof will be omitted.

First of all, in the transmitting side shown in FIG. 3, processing as far as the down-sampler 109 is identical with that of the embodiment shown in FIG. 1. The embodiment of FIG. 3 differs from the embodiment of FIG. 1 in that a second linear prediction analyzer 301, a second inverse filter 302, and a second linear prediction synthesizer of autoregression system type 303 have been added between the down-sampler 109 and the linear prediction synthesizer 110. Herein, therefore, the linear prediction analyzer 103 is referred to as first linear prediction analyzer, and the inverse filter 104 and the linear prediction synthesizer 110 are also referred to as first inverse filter and first linear prediction synthesizer, respectively.

The receiving side shown in FIG. 4 differs from the embodiment shown in FIG. 2 in that a down-sampler 401, a fourth linear prediction analyzer 402 and a fourth linear prediction synthesizer 403 of auto-regression system type are added between the inverse filter 204 and the up-sampler 205 and accordingly insertion positions of the band-pass filter 206 and the low-pass filter 207 are changed. Herein, therefore, the inverse filter 204 is referred to as second inverse filter, and the linear prediction analyzer 203 and the linear prediction synthesizer 210 are referred to as third linear prediction analyzer and third linear prediction synthesizer, respectively.

Operation of this embodiment will now be described.

By the way, in this embodiment, the lower limit frequency of the frequency component of the original speech signal y(t) is $f_L$=300 Hz and the upper limit frequency thereof is $f_m$=3400 Hz. On the other hand, the sampling frequency is equally 8 kHz. Therefore, the sampling time interval Δt is also equally 125 μs.

First of all, the transmitting side of FIG. 3 will now be described. As described above, a baseband signal x'(nΔT) reduced in sample rate to ⅕ so as to have a sampling frequency of 1.6 kHz (sampling time interval ΔT=625 μs) appears at the output of the down-sampler 109.

This baseband signal x'(nΔT) is inputted to the second linear prediction analyzer 301 again. In the second linear prediction analyzer 301, linear prediction coefficients $a_i'$ associated with the pitch component are extracted.

By using the linear prediction coefficients $a_i'$ associated with the pitch component, the pitch component is removed in the second inverse filter 302 from the baseband signal x'(nΔT). A baseband signal x"(nΔT) which does not contain the pitch component is obtained at the output of this inverse filter 302.

At the same time, the second linear prediction synthesizer 303 also conducts linear prediction synthesizing processing on the low-frequency white noise signal supplied from the noise signal generator 108 by using the linear prediction coefficients $a_i'$ associated with the pitch component. The output of the second linear prediction synthesizer 303 is inputted to the variable gain amplifier 107 to derive a low frequency noise signal $X_{LN}$(nΔT) having a power level controlled so as to be linked to the power level of the high frequency component $f_m/C$ to $f_m$ of the residual signal x(nΔt).

Thereafter, the baseband signal x"(nΔT) outputted from the inverse filter 302 and the low frequency noise signal $X_{LN}$(nΔT) outputted from the variable gain amplifier 107 are added together. A resultant sum is supplied to the first linear prediction synthesizer 110 as an excitation input signal thereof.

Assuming now that the narrow band time series signal outputted from the first linear prediction synthesizer 110 is a time series digital signal w'(nΔT), therefore, it is expressed by the following equation (6).

$$w'(n\Delta T) = x_{LN}(n\Delta T) + x''(n\Delta T) - \sum_{i=1}^{N-1} a_i \cdot w'\{(n-i)\Delta T\} \tag{6}$$

The term $x_{LN}$(nΔT) Of the right side of this equation is a signal component having a frequency component of 60 to 300 Hz and containing spectrum parameters associated with pitch information. It can be appreciated that the term x"(nΔT) is a signal component which has a frequency component of 300 to 750 Hz and which does not contain the spectrum parameters associated with the pitch information.

In the same way as the embodiment of FIG. 1, the narrow band time-series digital signal w'(nΔT) obtained at the output of the linear prediction synthesizer 110 is thereafter supplied to the D/A (digital-analog) converter 111 and restored to a signal having an analog waveform. A narrow band analog signal w'(t) is thus obtained at the output terminal 112.

This narrow band analog signal w'(t) is carried by an analog signal transmission system, such as a telephone circuit or a radio channel and transmitted to the receiving side.

On the receiving side shown in FIG. 4, a time series digital signal w'(nΔT) is supplied to the third linear prediction analyzer 203 and values of the linear prediction coefficients $a_i$ are restored.

The narrow band time-series digital signal w'(nΔT) has components expressed by equation (6).

$$w'(n\Delta T) = x_{LN}(n\Delta T) + x''(n\Delta T) - \sum_{i=1}^{N-1} a_i \cdot w'\{(n-i)\Delta T\} \tag{6}$$

The pitch component is contained only in $X_{LN}$(nΔT), and the frequency component of $X_{LN}$(nΔT) is limited to a low frequency band of 300 Hz or below. Therefore, the influence of the pitch component does not appear in low degree linear prediction coefficients such as eighth to twelfth. Therefore, linear prediction coefficients $a_i$ outputted from the third linear prediction analyzer 203 are not influenced by the pitch information. The same values as those of the original linear prediction coefficients ai on the transmitting side are restored faithfully.

If computation according to the following equation (7) is conducted on the time-series digital signal w'(nΔT) in the second inverse filter 204 by using the linear prediction coefficients $a_i$, $X_{LN}$(nΔT)+x"(nΔT) is obtained as a prediction residual signal.

$$x_{LN}(n\Delta T) + x''(n\Delta T) = w'(n\Delta T) + \sum_{i=1}^{N-1} a_i \cdot w'\{(n-i)\Delta T\} \tag{7}$$

From this prediction residual signal, a low frequency noise signal component is removed and a primary reproduced baseband signal x"(nΔT) is taken out by the band-pass filter 206. The low frequency noise signal $x_{LN}$(nΔT) is extracted by the low-pass filter 207. Pitch information is not contained in the primary reproduced baseband signal x"(nΔT), but contained in only the low frequency noise signal $x_{LN}$(nΔT).

This low frequency noise signal $x_{LN}$(nΔT) is inputted to the down-sampler 401 to thin out data with a lower sampling frequency of 320 Hz. The thinned out signal is supplied to the fourth linear prediction analyzer 402. Spectrum parameters associated with pitch information are thus obtained. By using the pitch spectrum parameters, the fourth linear prediction synthesizer 403 conducts prediction synthesizing processing on the primary reproduced baseband signal x"(nΔT). The reproduced baseband signal x'(nΔT) is thus restored.

Succeeding processing for obtaining the reproduced speech signal y'(nΔt) from the reproduced baseband signal x'(nΔT) and obtaining the analog speech signal y'(t) at the output terminal 212 is the same as that of the embodiment shown in FIG. 2.

In the embodiment shown in FIGS. 3 and 4, therefore, residual of pitch information can be sufficiently suppressed without increasing the degree of the prediction coefficients and the cost increase and delay of signal processing can be certainly suppressed without degrading speech.

Each element in the above described embodiment will now be described.

Figure 7:
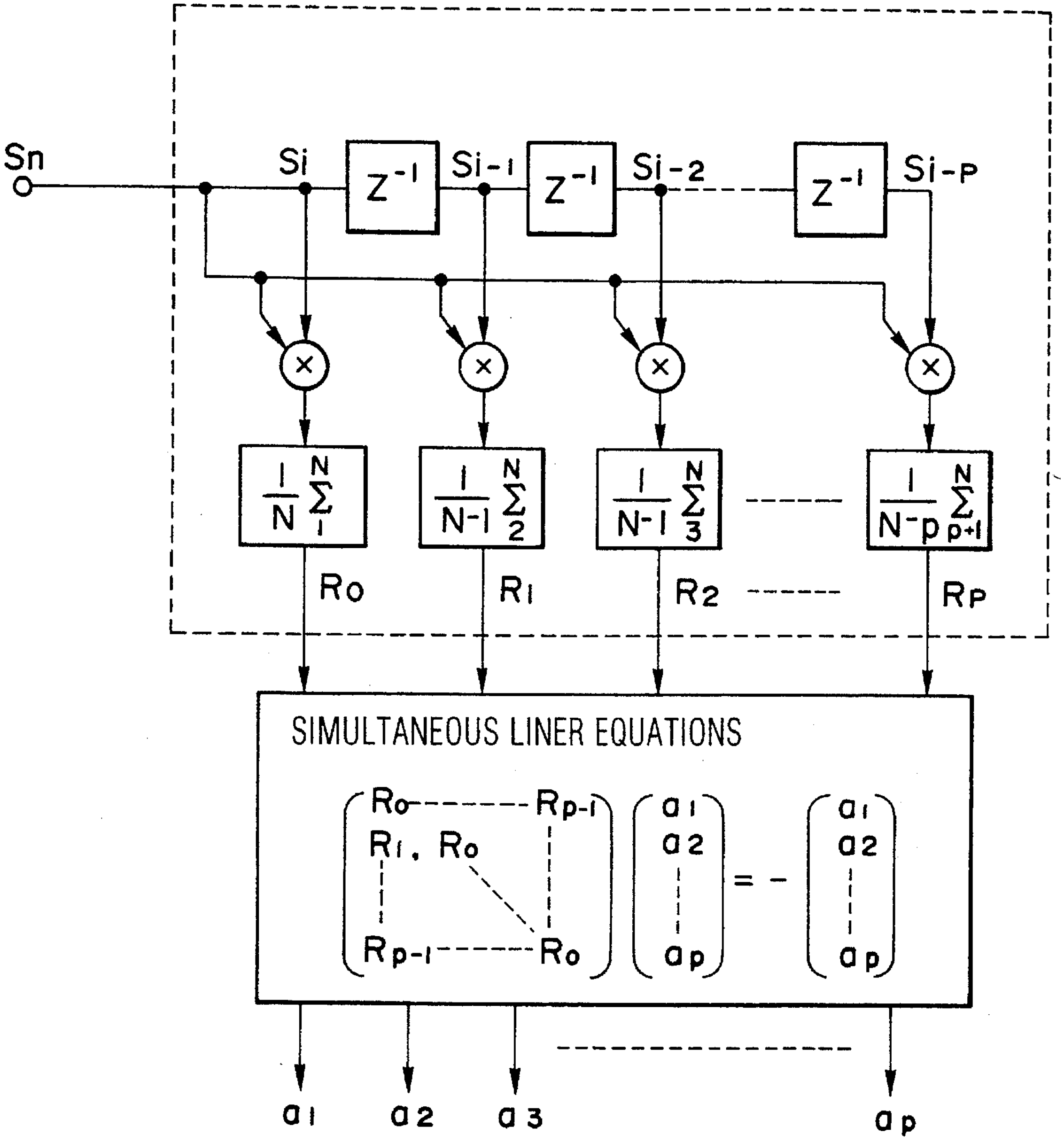
FIG. 7 is a diagram illustrating an example of a linear prediction analyzer in an embodiment of the present invention.

First of all, the linear prediction analyzers 103, 203, 301 and 402 have a function of, for example, executing processing in accordance with an algorithm shown in FIG. 7, calculating an autocorrelation function of a speech signal Sn, and determining coefficients $a_i$(i=1, 2, 3, . . . , N−1).

Although not especially needed to understand the present invention, details of this linear prediction analyzer are described in pp. 43–50 of "Computer speech processing", <Electronic science series>, published by Sanpo publishing Ltd. on Jun. 10, 1980, for example.

Inverse filtering processing conducted by the inverse filters 104, 204 and 302 is processing of knowing the above described coefficients $a_i$ (i=1, 2, 3, . . . , N−1) beforehand and calculating a residual signal such as the signal x(nΔt) on the basis of the coefficients. That is to say, computation is conducted in accordance with the above described equation (2).

Figure 8:
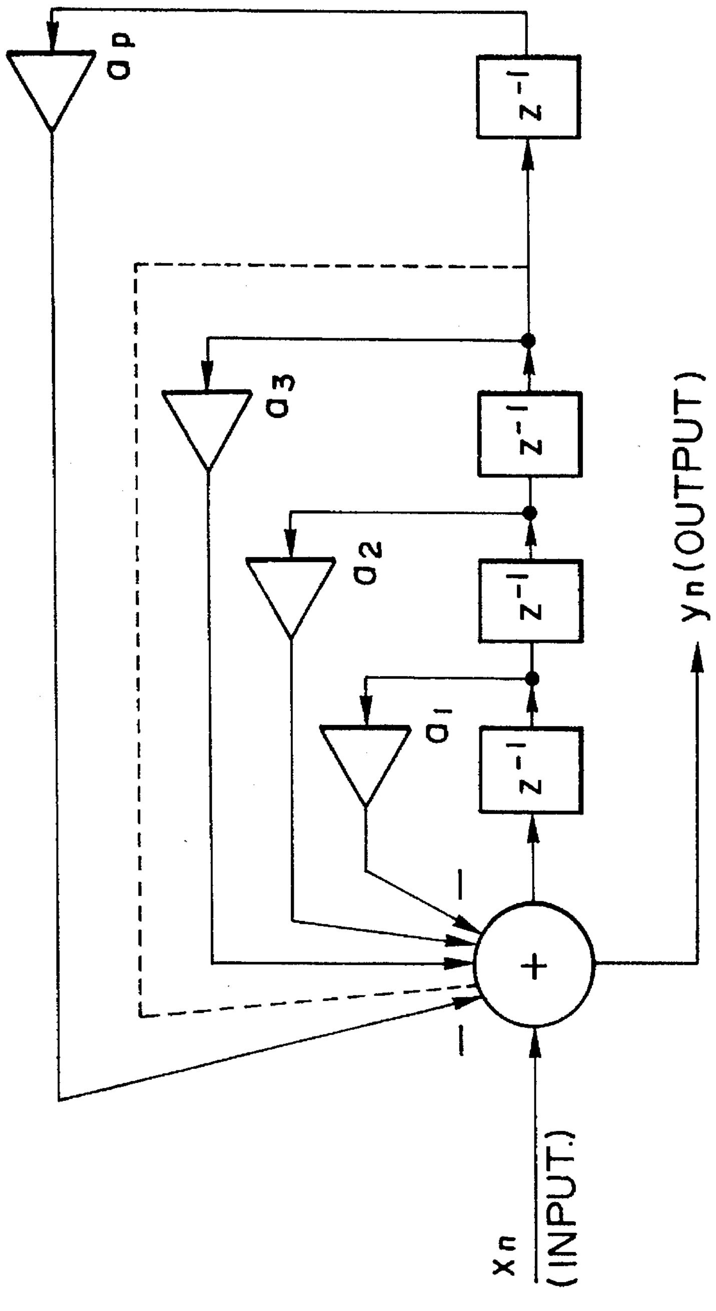
FIG. 8 is a diagram illustrating an example of a linear prediction synthesizer in an embodiment of the present invention.

The linear prediction synthesizers 110, 210, 303 and 403 conduct computation in accordance with the above described equation (3). The linear prediction synthesizers 110, 210, 303 and 403 have a function of synthesizing a speech signal by using the residual signal and processing shown in FIG. 8.

Although not especially needed to understand the present invention, details of this linear prediction synthesizer are also described in pp. 50–53 of the aforementioned "Computer speech processing", <Electronic science series>, published by Sanpo publishing Ltd. on Jun. 10, 1980, for example.

In the embodiments of the receiving side shown in FIGS. 2 and 4, the high frequency band signal generator 209 is used. Instead of this, a white noise signal generator or an M series noise signal generator may be used.

The reason why the high frequency band signal generator 209 is used in the embodiments to obtain a noise signal from a low frequency component $f_L$ to $f_m$/C of the reproduced time-series signal x'(nΔt) is that it is said that a better speech quality is obtained by doing so.

This high frequency band signal generator 209 is configured so as to full-wave rectify an inputted signal, then emphasize the high frequency band, and take out only the component of a predetermined frequency such as 750 Hz or above.

In the configuration of the above described embodiments, the high-pass filter 106 and the variable gain amplifier 107 of the transmitting side, and the variable gain amplifier 208 of the receiving side are auxiliary means for speech communication. Even in the configuration without these means, spectrum information of speech is transmitted as linear prediction coefficients and hence speech communication of a predetermined quality can be performed. As a matter of course, however, speech communication of a higher quality can be performed by adding the above described auxiliary means to the configuration as in the above described embodiments.

Figure 5:
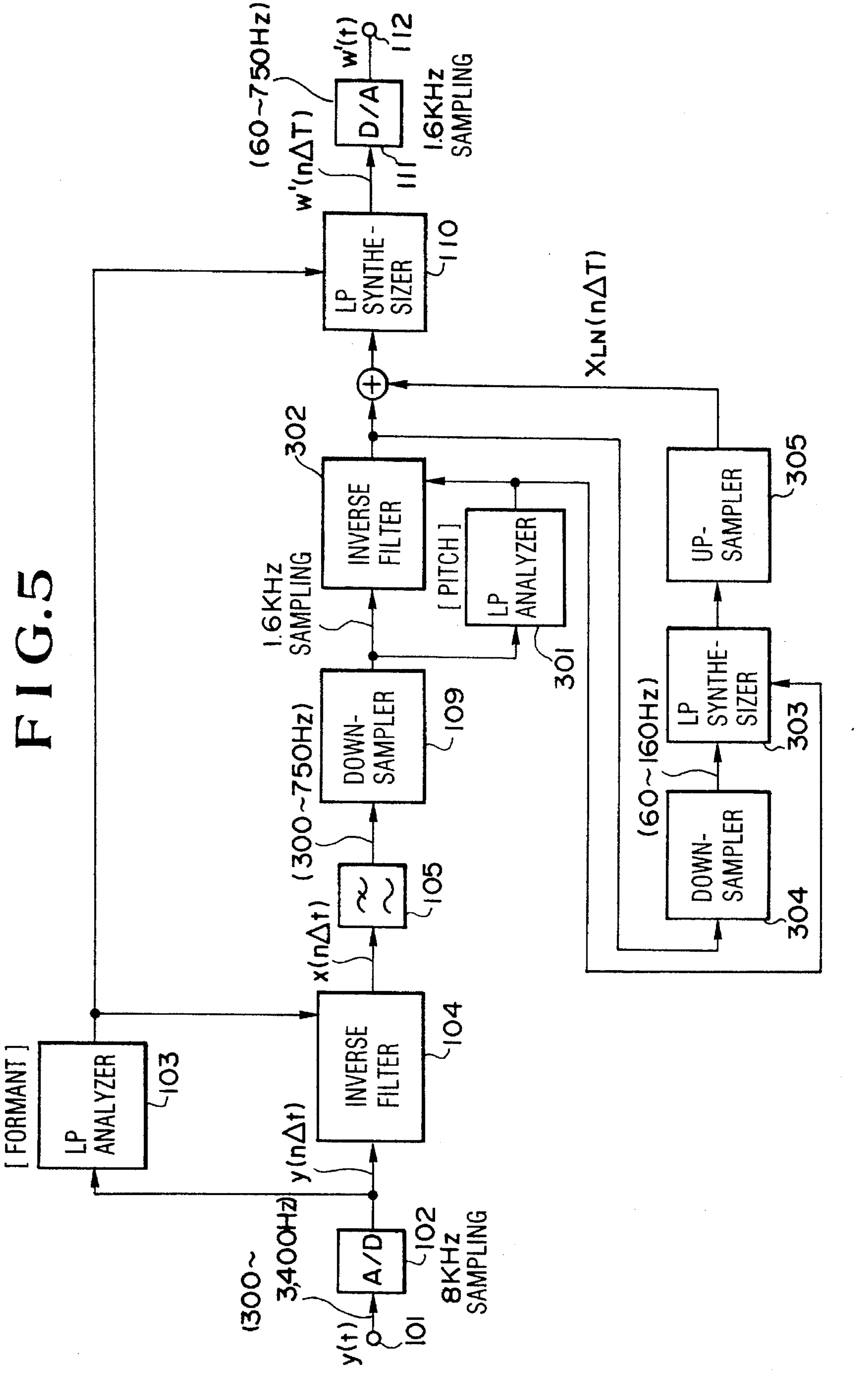
FIG. 5 is a block diagram showing the configuration of a transmitting side in still another embodiment of a speech signal bandwidth compression and expansion apparatus according to the present invention.

In the embodiment shown in FIG. 3, the noise signal generator 108 is provided to obtain a low frequency white noise signal for transmitting pitch information and the high-pass filter 106 and the variable gain amplifier 107 are provided to link the output level of the noise signal generator 108 to the power level of the high frequency component of the residual signal. FIG. 5 shows another embodiment taking the place thereof and obtaining a required low frequency noise signal by using a simpler circuit configuration. In FIG. 5, components which are identical with or correspond to those of the embodiment of FIG. 3 are denoted by like characters and detailed description thereof will be omitted.

In the embodiment of FIG. 5, the high-pass filter 106, the variable gain amplifier 107 and the noise signal generator 108 included in the embodiment of FIG. 3 are removed and a down-sampler 304 and an up-sampler 305 are added. A part of output of the inverse filter 302 is reduced in sample rate to one fifth by the down-sampler 304. A resultant signal having a sample frequency of 320 Hz is supplied to the linear prediction synthesizer 303. The output of the inverse filter 302 is equivalent to the original speech signal with the formant component and pitch component removed. Therefore, the output of the inverse filter 302 can be regarded as nearly perfect white noise. By down-sampling the output of the inverse filter 302, it is converted to low frequency white noise. Its power level is nearly proportionate to the power level of the baseband signal x"(nΔT). Since the power level of the baseband signal x"(nΔT) can be considered to be nearly also linked to the power level of the high frequency component of $f_m/C$ to $f_m$ of the residual signal x(nΔt), the desired low frequency noise signal $x_{LN}$(nΔT) can be obtained by up-sampling the output of the linear prediction synthesizer 303 in the up-sampler 305.

In the embodiment shown in FIG. 3 or FIG. 5, linear prediction coefficients $a_i'$ associated with the pitch information i.e., the pitch component are obtained by making a linear prediction analysis on the low frequency band residual signal of 300 to 750 Hz. Denoting the fundamental frequency of the pitch component by $f_p$, $f_p$ extends over a wide range of 50 Hz (male low-frequency speech) to 500 Hz (female high-frequency speech).

If $f_p$ is 300 Hz or above, $f_p$ is contained in the range of the above described low frequency band signal of 300 to 750 Hz. By the above described linear prediction analysis, accurate pitch information is extracted.

If $f_p$ is 250 Hz or below, $f_p$ is not contained in the range of the low frequency band signal of 300 to 750 Hz, but a plurality of higher harmonics such as $2f_p$, $3f_p$, . . . are contained therein. When a high frequency band is to be generated on the receiving side from the pitch information derived on the basis of the harmonics, the pitch component can be reproduced by using a modulation product such as $3f_p-2f_p=f_p$.

In case $f_p$ is above 250 Hz and below 300 Hz, only the second harmonic $2f_p$ is contained in the low frequency band residual signal. If a linear prediction analysis is made on the basis of the second harmonic $2f_p$, an erroneous result having $2f_p$ as the pitch component is obtained. This is called double pitch extraction and changes speech to falsettos. If this phenomenon frequently occurs, it becomes a major cause of speech quality degradation.

Figure 6:
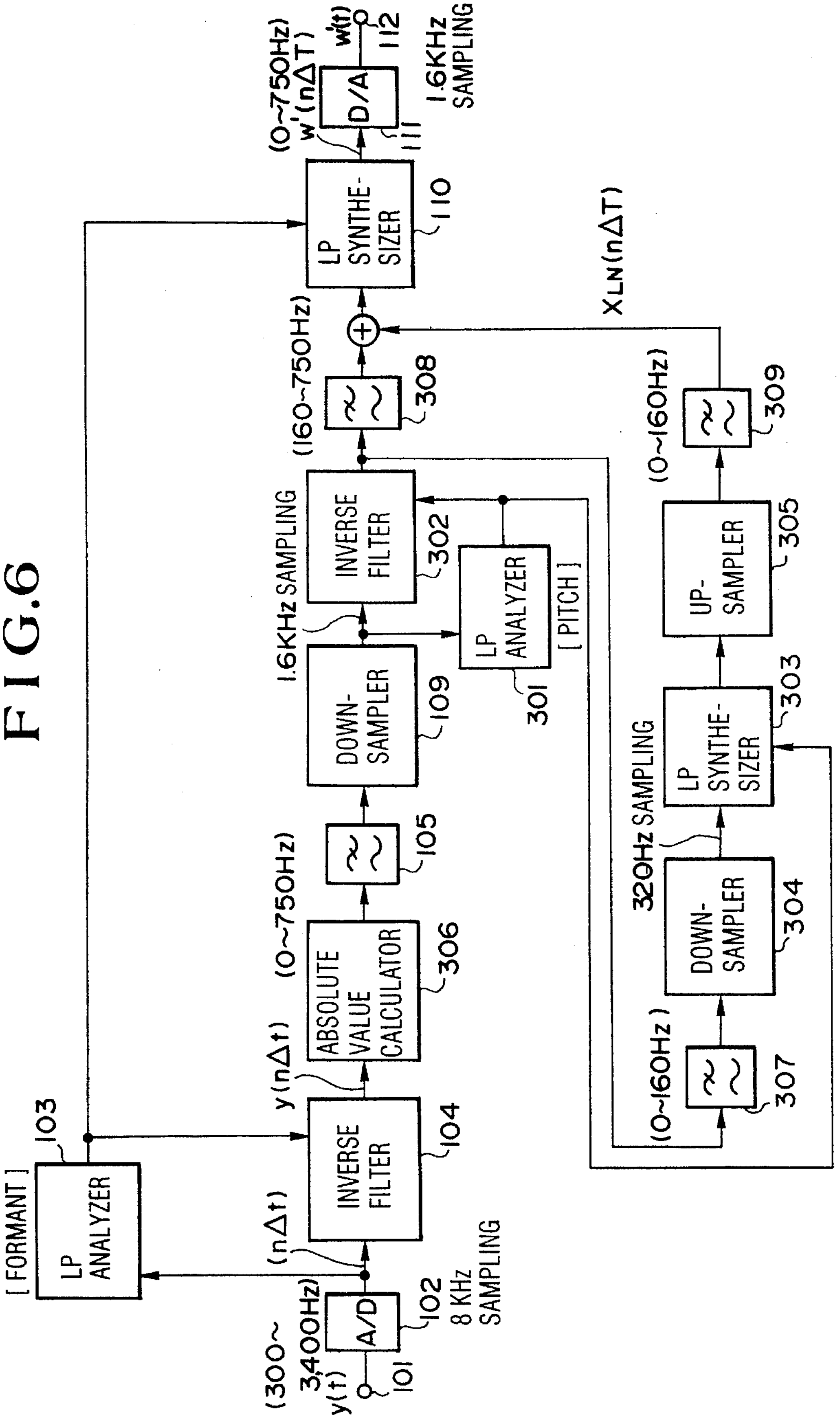
FIG. 6 is a block diagram showing the configuration of a transmitting side in yet another embodiment of a speech signal bandwidth compression and expansion apparatus according to the present invention.

FIG. 6 shows an embodiment in which this point has been improved. In FIG. 6, components which are identical with or correspond to those of the embodiment shown in FIG. 3 or 5 are denoted by like numerals and detailed description thereof will be omitted.

As compared with the embodiment of FIG. 5, in the embodiment of FIG. 6, a nonlinear circuit 306 is inserted after the inverse filter 104 and besides low-pass filters 307 and 309 and a high-pass filter 308 is added.

As the nonlinear circuit 306, any circuit can be generally used so long as there is a nonlinear relation between its input and its output. As the simplest circuit, however, an absolute value circuit outputting the absolute value of its input, i.e., a full wave rectifier circuit can be used.

The output of the inverse filter 104 has a frequency band of 300 to 3400 Hz. Upon being subjected to nonlinear processing in the nonlinear circuit 306, a frequency band of 0 to 3,400 Hz or above is caused by modulation product. Even if $f_p$ is 300 Hz or below, components such as $f_p$, $2f_p$, . . . are generated within the band of 0 to 300 Hz.

The output of the nonlinear circuit is passed through the band-pass filter 105 and consequently converted to a signal having a frequency band of 0 to 750 Hz. The resulting signal is subjected to downsampling and linear prediction analysis in the linear prediction analyzer 301. As a result, accurate pitch information can be always extracted irrespective of $f_p$.

In the embodiment of FIG. 5, the output of the inverse filter circuit 302 has a frequency band of 300 to 750 Hz. In the embodiment of FIG. 6, the output of the inverse filter circuit 302 has a frequency band of 0 to 750 Hz. Therefore, the output is divided into a high frequency band component of 160 Hz or above and a low frequency band component of 160 Hz or below by the high-pass filter 308 and the low-pass filter 307. The low frequency band component is subjected to linear prediction synthesis using pitch information and passed through the low-pass filter 309. The output of the low-pass filter 309 is combined with the output of the above described high-pass filter 308 to produce a baseband signal.

In the embodiments heretofore described, a speech signal y(nΔt) has been defined by the above described equation (1) and prediction analysis has been considered to be deriving prediction coefficients $a_i$ (i=1, 2, 3, . . . , N−1). However, implementation is not limited to this. Prediction analysis processing in the present invention is not limited to the above described embodiments.

Typically, by describing a speech signal in a z-transform form and supposing that relation $$y(z)=x(z)/1+F(z^{-1})$$

holds true, $F(z^{-1})$ is identified. Various methods for doing this are known. The prediction analysis in the present invention includes all of them.

And the linear prediction system in the present invention means every system for deriving x(z) from y(z) by the following relation.

$$x(z)=\{1+F(z^{-1})\}y(z)$$

The autoregression system in the present invention means every system for deriving y(z) from x(z) by the following relation.

$$y(z)=x(z)/1+F(z^{-1})$$

According to the present invention, system parameters used for analysis and synthesis of a speech signal are embedded in a narrow band analog signal and transmitted. Therefore, it becomes easy to obtain a speech signal bandwidth compression and expansion apparatus making possible transmission over a narrow band analog transmission system in addition to conversion of sampling rate.

Furthermore, according to the present invention, the low frequency component forming a principal part of the original speech signal is transmitted as it is and the low frequency component is used as a part of an excitation signal on the receiving side. Therefore, it becomes possible to easily obtain a speech transmission method and a reproduction method of high quality free from deterioration of articulation in spite of narrow band transmission. That is to say, according to the present invention, a low frequency band residual signal is used as the excitation signal of the receiving side. Therefore, information in a part where prediction has not come true is interpolated. As a result, degradation of phonemic property is little and hence high articulation can be maintained.

Since narrow band transmission with high articulation maintained thus becomes possible, the cost of the transmission circuit can be reduced and besides limited resources, especially the radio frequency band can be used efficiently.

By the way, in digital transmission methods, parameter values are updated every frame period. As a result, there is a fear that a discontinuous part of speech may be caused by a jump at the end of a frame. Since transmission in the form of an analog waveform is possible according to the present invention, however, the linear prediction coefficients also respond almost in real time. Therefore, there is no fear that discontinuity may appear in speech.

We claim:

1. A speech signal bandwidth compression and expansion apparatus having a transmitting side and a receiving side, said transmitting side comprising:

linear prediction analyzer means for extracting system parameters from a speech signal to be transmitted;

a linear prediction system for conducting inverse filter processing to obtain a prediction residual signal from said speech signal by using said system parameters;

filter means for removing a high frequency band component of said prediction residual signal;

down-sampler means for lowering a sampling rate of an output signal of said filter means by a predetermined rate to obtain a baseband signal; and linear prediction synthesizer means for obtaining a narrow band time series signal from said baseband signal by using said system parameters, and said receiving side comprising:

a linear prediction system for conducting inverse filter processing to generate a reproduced baseband signal from said narrow band time series signal;

up-sampler means for raising a sampling rate of said reproduced baseband signal by a predetermined rate to obtain a reproduced time series signal;

means for generating a high frequency band component from said reproduced time series signal;

means for adding said generated high frequency band component to said reproduced baseband signal to obtain an excitation signal; and linear prediction synthesizer means for deriving a reproduced speech signal from said excitation signal by using said system parameters.

2. A speech signal bandwidth compression and expansion apparatus according to claim 1, wherein said transmitting side further comprises means for adding a low frequency noise signal having a power level linked to a power level of a high frequency band component of said prediction residual signal to a low frequency band component of said prediction residual signal to obtain a time series signal, and means for lowering a sampling rate of said time series signal by a predetermined ratio to obtain a baseband signal, and wherein said receiving side further comprises means for generating a low frequency noise signal by linking a power level of a high frequency band component of said reproduced time series signal to a power level of a low frequency band component of said reproduced time series signal, and means for adding said low frequency noise signal to a high frequency band component of said reproduced baseband signal to obtain an excitation signal.

3. A speech signal bandwidth compression and expansion apparatus having a transmitting side and a receiving side, said transmitting side comprising:

first linear prediction analyzer means for extracting first system parameters associated with formant of a speech signal to be transmitted;

a first linear prediction system for obtaining a first prediction residual signal from said speech signal by using said first system parameters;

second linear prediction analyzer means for extracting second system parameters associated with pitch of the speech signal from a low frequency band component of said first prediction residual signal downsampled;

a second linear prediction system for obtaining a second prediction residual signal from the low frequency band component of said first prediction residual signal by using said second system parameters;

first linear prediction synthesizer means for obtaining a low frequency noise signal from a white noise signal by using said second system parameters;

means for adding an output signal of said first linear prediction synthesizer means to said prediction residual signal to obtain a baseband signal; and second linear prediction synthesizer means for obtaining a narrow band waveform speech signal from said baseband signal by using said first system parameters, and said receiving side comprising:

third linear prediction analyzer means for extracting said first system parameters from the received narrow band waveform speech signal;

a third linear prediction system for obtaining a reproduced linear prediction residual signal from said narrow band waveform speech signal by using said first system parameters;

fourth linear prediction analyzer means for extracting said second system parameters from a low frequency noise component of said reproduced linear prediction residual signal downsampled;

filter means for removing a low frequency noise component from said reproduced prediction residual signal;

third linear prediction synthesizer means for obtaining a first reproduced baseband signal from an output signal of said filter means by using said second system parameters;

means for up-sampling said first reproduced baseband signal and then generating a high frequency band component;

means for adding said generated high frequency band component to said first reproduced baseband signal to obtain an excitation signal; and fourth linear prediction synthesizer means for generating a reproduced speech signal from said excitation signal by using said first system parameters.

4. A speech signal bandwidth compression and expansion apparatus according to claim 3, wherein said transmitting side further comprises means for down-sampling said second prediction residual signal and obtaining a white noise signal and means for up-sampling the output signal of said first linear prediction synthesizer means.

5. A speech signal bandwidth compression and expansion apparatus according to claim 4, wherein said transmitting side further comprises means for conducting nonlinear processing on said first prediction residual signal to generate a fundamental frequency component of a low frequency pitch component.

6. A speech signal bandwidth compression and expansion apparatus according to claim 3, wherein said transmitting side further comprises means for conducting nonlinear processing on said first prediction residual signal to generate a fundamental frequency component of a low frequency pitch component.

7. A speech signal bandwidth compression and expansion apparatus according to claim 3, wherein said transmitting side further comprises means for outputting said low frequency noise signal so as to link a level of said low frequency noise signal to a power level of a high frequency band component of said first prediction residual signal, and means for adding an output signal of said means to said second prediction signal to obtain a baseband signal, and said receiving side further comprises means for outputting said high frequency component so as to link a level of said high frequency component to a power level of a low frequency component of the said narrow band waveform speech signal and means for adding an output signal of said means to said first reproduced baseband signal to obtain an excitation signal.

8. A speech signal bandwidth compressing transmission method for sampling a speech signal to obtain a sampled signal, extracting system parameters indicating characteristics of said speech signal from said sampled signal, generating a prediction residual signal from said sampled signal by using said sampled system parameters, and transmitting at least a required component of said prediction residual signal and information of said system parameters, said speech signal bandwidth compressing transmission method comprising the steps of:

removing a high frequency band component from said prediction residual signal and compressing a bandwidth of said prediction residual signal to a predetermined bandwidth;

combining said bandwidth-compressed signal with said system parameters in a form of autocorrelation; and converting said combined signal to an analog waveform and transmitting said analog waveform.

9. A speech signal bandwidth compressing transmission method according to claim 8, further comprising the steps of:

in addition to removing a high frequency band component from said prediction residual signal, adding a low frequency noise signal having a power level linked to a power level of the high frequency band component of said prediction residual signal;

lowering a sampling rate of said added signal to a predetermined rate and thereafter combining a resultant signal with said system parameters in a form of autocorrelation; and converting said combined signal to an analog waveform and transmitting said analog waveform.

10. A speech signal reproducing method for receiving a signal including at least a required component of a prediction residual signal of a speech signal and information of system parameters of the speech signal and reproducing the speech signal from the received signal, said speech signal reproducing method comprising the steps of:

sampling said received signal having an analog waveform and then extracting said system parameters;

generating a prediction residual signal from said signal by using said extracted system parameters;

generating a high frequency band component from said prediction residual signal, thereafter adding said generated high frequency band component to said prediction residual signal to perform expansion to a predetermined bandwidth; and combining said expanded signal with said system parameters in a form of autocorrelation to obtain a reproduced speech signal.

11. A speech signal reproducing method according to claim 10, further comprising the steps of:

generating a time series signal having a sampling rate raised to a predetermined rate from said prediction residual signal;

generating a high frequency band component from said time series signal and detecting a level change of a low frequency noise signal contained in said time series signal;

controlling a power level of said generated high frequency band component according to said detected level change and thereafter adding said signal to said time series signal to perform expansion to a predetermined bandwidth; and combining said expanded signal with said system parameters in a form of autocorrelation to obtain a reproduced speech signal.

* * * * *